United States Patent
Jin

(10) Patent No.: US 11,229,904 B2
(45) Date of Patent: Jan. 25, 2022

(54) CAP MANIPULATOR AND CAP ASSEMBLY

(71) Applicant: BOE TECHNOLOGY GROUP CO., LTD., Beijing (CN)

(72) Inventor: Xin Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 398 days.

(21) Appl. No.: 16/339,312

(22) PCT Filed: May 14, 2018

(86) PCT No.: PCT/CN2018/086704
§ 371 (c)(1),
(2) Date: Apr. 3, 2019

(87) PCT Pub. No.: WO2018/223817
PCT Pub. Date: Dec. 13, 2018

(65) Prior Publication Data
US 2019/0224665 A1    Jul. 25, 2019

(30) Foreign Application Priority Data

Jun. 8, 2017  (CN) .......................... 201720661514.0

(51) Int. Cl.
*B65D 51/24* (2006.01)
*B01L 3/00* (2006.01)
(Continued)

(52) U.S. Cl.
CPC .............. *B01L 3/00* (2013.01); *A01N 1/0263* (2013.01); *A01N 1/0268* (2013.01); *B01L 9/00* (2013.01);
(Continued)

(58) Field of Classification Search
None
See application file for complete search history.

(56) References Cited

U.S. PATENT DOCUMENTS

| 5,846,489 A | 12/1998 | Bienhaus et al. |
| 7,347,338 B2 * | 3/2008 | Korpela .............. B01L 3/50825 215/355 |

(Continued)

FOREIGN PATENT DOCUMENTS

| CN | 202315936 U | 7/2012 |
| CN | 204568346 U | 8/2015 |

(Continued)

OTHER PUBLICATIONS

International Search Report and English Translation of Box V of the Written Opinion dated Jul. 26, 2018, received for corresponding PCT Application No. PCT/CN2018/086704.

*Primary Examiner* — Paul S Hyun
(74) *Attorney, Agent, or Firm* — Kinney & Lange, P.A.

(57) ABSTRACT

A cap manipulator and a cap assembly are provided. The cap manipulator includes a first airbag member, a second airbag member, and an airstream channel structure therebetween and enabling inner spaces of the first airbag member and the second airbag member to be communicated. If the second airbag member is squeezed, a volume of the first airbag member is greater than that of an insertion space, and if the second airbag member is not squeezed, the volume of the first airbag member is smaller than or equal to that of the insertion space.

10 Claims, 8 Drawing Sheets

(51) Int. Cl.
*A01N 1/02* (2006.01)
*B01L 9/00* (2006.01)
*B65D 51/00* (2006.01)

(52) U.S. Cl.
CPC ............ *B65D 51/00* (2013.01); *B65D 51/24* (2013.01); *B65D 51/243* (2013.01); *B01L 2200/141* (2013.01); *B01L 2300/042* (2013.01); *B01L 2300/046* (2013.01); *B01L 2300/0832* (2013.01); *B01L 2300/123* (2013.01); *B65D 2251/02* (2013.01); *B65D 2251/04* (2013.01)

(56) References Cited

U.S. PATENT DOCUMENTS 7,666,357 B2 * 2/2010 Sattler ................ B67B 7/182
422/547
9,162,228 B2 * 10/2015 Knight ............... G01N 35/1002

FOREIGN PATENT DOCUMENTS

| CN | 206103959 U | 4/2017 |
| CN | 206184469 U | 5/2017 |
| CN | 206798151 U | 12/2017 |
| WO | 2008096225 A2 | 8/2008 |

* cited by examiner

CAP MANIPULATOR AND CAP ASSEMBLY

CROSS-REFERENCE TO RELATED APPLICATION

The present application is a U.S. national phase application of PCT Application No. PCT/CN2018/086704 filed on May 14, 2018, which claims a priority of the Chinese patent application No. 201720661514.0 filed in China on Jun. 8, 2017, a disclosure of which is incorporated herein by reference in its entirety.

TECHNICAL FIELD

The present disclosure relates to the field of experimental facilities, and in particular, relates to a cap manipulator and a cap assembly.

BACKGROUND

Using containers to receive substances used for experiments is a common scene in various experimental environments. In order to ensure sealability of a container containing substances and prevent substances in the container from being polluted by external contaminants, the container is equipped with a cap. In related arts, attaching the cap to the container or detaching the cap from the container requires an operator to hold the container with one hand and hold the cap with the other hand. However, if the container is of a relatively small volume, the operator's finger may touch a mouth of the container and a portion of the cap extending inside the container. If the touch happens, the substances in the container may be polluted.

For example, a cryogenic vial for cell culture is usually of a small volume, and cell cryopreservation is an operation in a germfree environment. If the cryogenic vial is attached to or detached from the cap in the above-mentioned way, not only cells cultured in the cryogenic vial may be polluted, but also the operation may be difficult.

Hence, there is an urgent need to provide a cap manipulator for manipulating the cap, so as to prevent the finger from touching the mouth of the container and the cap, thereby to prevent the substances in the container from being polluted.

SUMMARY

An object of the present disclosure is to provide a cap manipulator and a cap assembly.

In a first aspect, a cap manipulator is provided in the present disclosure, wherein the cap manipulator is used for a cap with an insertion space, the cap manipulator includes: a first airbag member and a second airbag member; and, an airstream channel structure connected between the first airbag member and the second airbag member, and configured to enable an inner space of the first airbag member to communicate with an inner space of the second airbag member, wherein under a condition that the second airbag member is squeezed, a volume of the first airbag member is larger than a volume of the insertion space, and under a condition that the second airbag member is not squeezed, the volume of the first airbag member is smaller than or equal to the volume of the insertion space.

Optionally, in the cap manipulator, the airstream channel structure includes a first end surface, a second end surface, and a channel between the first end surface and the second end surface and running through the airstream channel structure, the first airbag member is arranged at the first end surface, the second airbag member is arranged at the second end surface, and the inner space of the first airbag member communicates with the inner surface of the second airbag member through the channel.

Optionally, in the cap manipulator, the airstream channel structure is of a column shape, and the first end surface and the second end surface are two opposite end surfaces of the airstream channel structure.

Optionally, in the cap manipulator, cross sections of the airstream channel structure at positions along the airstream channel structure have a same structure and a same size, and each of the cross sections is perpendicular to an extension direction of the airstream channel structure.

Optionally, in the cap manipulator, the airstream channel structure includes a mating member, the mating member is connected to the first airbag member and is configured to drive the cap to rotate with rotation of the mating member.

Optionally, in the cap manipulator, the insertion space is a polyhedral space, the mating member is of a polyhedral structure, and outer surfaces of the mating member mate with inner surfaces of the insertion space in a one-to-one correspondence manner.

Optionally, in the cap manipulator, the insertion space is a regular hexagonal space, and the mating member is a regular hexagonal structure.

Optionally, the cap manipulator further includes: a third airbag member in the channel, wherein the first airbag member, the second airbag member and the third airbag member are connected integrally.

A cap assembly is further provided in the present disclosure and includes a cap with an insertion space, and the cap manipulator, wherein the cap manipulator is in a first state in which the first airbag member is inside the insertion space or in a second state in which the first airbag member is pulled out of the insertion space.

Optionally, in the cap assembly, the cap includes a first member and a second member connected to the first member, the insertion space is at an end surface of the first member away from the second member, and an outer circumferential surface of the second member is threaded; under a condition that the cap manipulator is in the first state, at least a portion of the airstream channel structure is in the insertion space, so that a mating member is formed in the airstream channel structure and is configured to drive the first member to rotate when the airstream channel structure is rotated.

According to the embodiments of the present disclosure, the cap manipulator is provided with the airbag members with variable volumes, and based on structural features of the airbag members, the airbag members may be fixedly attached to or detached from the cap. In addition, under a condition that the airbag member is fixedly attached to the cap, the cap may be attached to or detached from a container when the cap manipulator is hold by hands of an operator, i.e., the attachment of the cap to the container or the detachment of the cap from the container does not need the operator to hold the cap, so an substance in the container may be prevented from being polluted.

DETAILED DESCRIPTION

Technical solutions of the present disclosure will be described hereinafter clearly and completely in conjunction with drawings in the embodiments of the present disclosure. Obviously, the embodiments described herein are merely a part of, rather than all of, the embodiments of the present disclosure. Based on these embodiments in the present disclosure, all other embodiments obtained by a person skilled in the art without any creative effort fall within the scope of the present disclosure.

The present disclosure provides a cap manipulator and a cap assembly. Using the cap manipulator, a cap may be attached onto or detached from a container fitted with the cap under a condition that a finger does not directly contact the cap, thereby preventing a substance in the container from being polluted.

Figure 1:
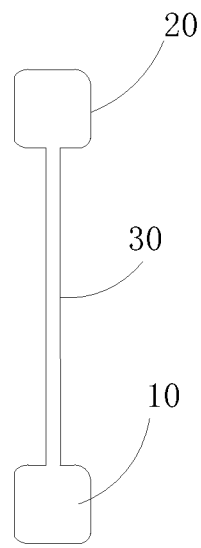
FIG. 1 is a structural schematic view of a cap manipulator in a first state according to some embodiments of the present disclosure.
Figure 2:
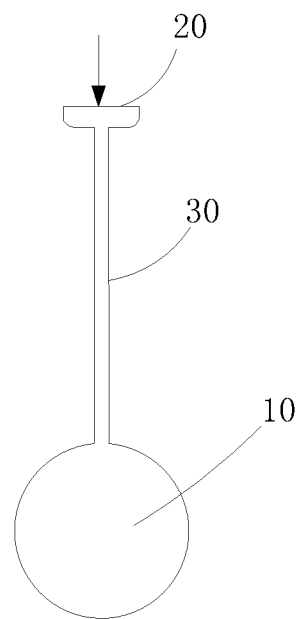
FIG. 2 is a structural schematic view of the cap manipulator in a second state according to some embodiments of the present disclosure.

Some embodiments of the present disclosure provide a cap manipulator used for a cap provided with an insertion space. As shown in FIGS. 1 and 2, the cap manipulator provided in some embodiments of the present disclosure includes a first airbag member 10, a second airbag member 20, and an airstream channel structure 30 connected between the first airbag member 10 and the second airbag member 20. An inner space of the first airbag member 10 communicates with an inner space of the second airbag member 20 through the airstream channel structure 30. Under a condition that the second airbag member 20 is squeezed, a volume of the first airbag member 10 is greater than a volume of the insertion space, and under a condition that the second airbag member 20 is not squeezed, the volume of the first airbag member 10 is smaller than or equal to the volume of the insertion space.

Specifically, FIG. 1 shows a structural schematic diagram of the first airbag member 10 and the second airbag member 20 in a natural state, and FIG. 2 shows a structural schematic diagram of a condition that the second airbag member 20 is squeezed. As shown in FIGS. 1 and 2, since the airstream channel structure 30 connected between the first airbag member 10 and the second airbag member 20 enables the inner space of the first airbag member 10 to communicate with the inner space of the second airbag member 20, under a condition that the second airbag member 20 is squeezed, air in the second airbag member 20 may enter the first airbag member 10, so as to increase the volume of the first airbag member 10.

Based on above-mentioned structural features, before the second airbag member 20 is squeezed, since the volume of the first airbag member 10 is smaller than or equal to the volume of the insertion space in the cap to which the cap manipulator is applied, the first airbag member 10 may be inserted into the insertion space of the cap. After the first airbag member 10 is inserted in the insertion space of the cap and under a condition that the second airbag member 20 is squeezed, the volume of the first airbag member 10 may increase. Under a condition that the increased volume of the first airbag member 10 is greater than the volume of the insertion space of the cap, an elastic force may be applied by the first airbag member 10 to an inner surface of the insertion space in a direction that the volume of the first airbag member 10 is enlarged, when the second airbag member 20 is squeezed, so as to enable the first airbag member 10 to be fixedly attached to the cap.

In this way, when the cap is connected to the container in an insertable manner, since the first airbag member 10 is fixedly attached to the cap, the cap may be attached to the container or detached from the container by grasping the cap manipulator with the above-mentioned structure. As a result, through the cap manipulator, the cap may be attached to or detached from the container easily without grasping the cap, thereby to prevent the substance in the container from being polluted under a condition that the cap is hold with a hand.

In the embodiments of the present disclosure, the airstream channel structure 30 may include a pipeline structure made of a soft plastic material. Optionally, the airstream channel structure 30 may include a solid structure made of a metal material or a hard plastic material, wherein a channel may be formed inside the solid structure, so as to enable the inner space of the first airbag member 10 to communicate with the inner space of the second airbag member 20. In addition, a specific structure of the airstream channel structure 30 may not be limited to the above-mentioned structure, i.e., the airstream channel structure 30 may be any structure enabling air flowing between the first airbag member 10 and the second airbag member 20.

Figure 3:
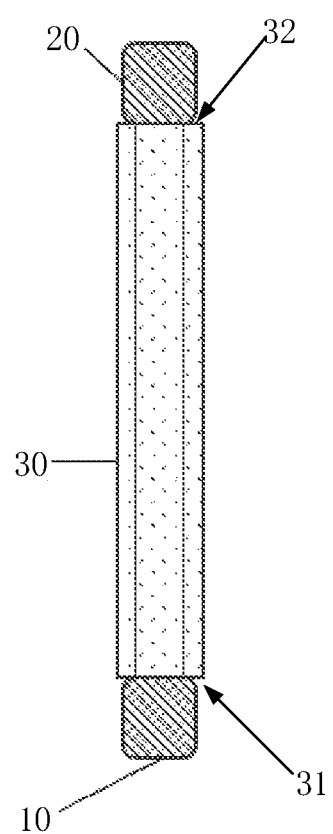
FIG. 3 is another schematic view of the cap manipulator in the first state according to some embodiments of the present disclosure.
Figure 4:
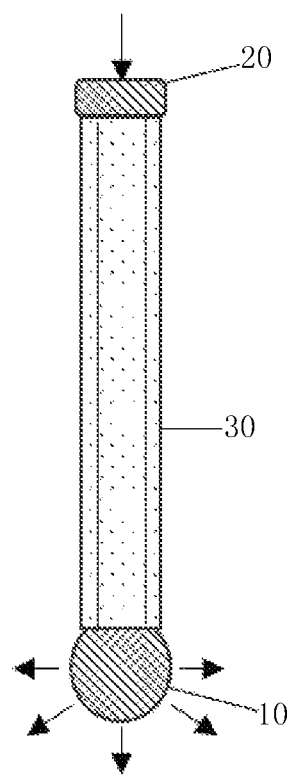
FIG. 4 is another schematic view of the cap manipulator in the second state according to some embodiments of the present disclosure.

FIGS. 3 and 4 are structural schematic diagrams of the cap manipulator in two states provided in some embodiments of the present disclosure, respectively. As shown in FIGS. 3 and 4, the cap manipulator provided in some embodiments of the present disclosure includes the first airbag member 10, the second airbag member 20 and the airstream channel structure 30.

Figure 5:
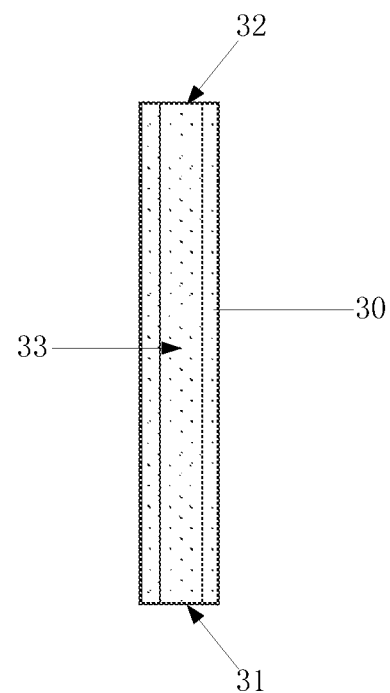
FIG. 5 is a structural front view of an air-stream channel structure in the cap manipulator according to some embodiments of the present disclosure.

As shown in FIG. 5, in the embodiments of the present disclosure, the airstream channel structure 30 may include a first end surface 31, a second end surface 32, and a channel 33 between the first end surface 31 and the second end surface 32 and running through the airstream channel structure 30. The first airbag member 10 may be arranged at the first end surface 31, the second airbag member 20 may be arranged at the second end surface 32, and the inner space of the first airbag member 10 may communicate with the inner surface of the second airbag member 20 through the channel 33.

The airstream channel structure 30 may be made of a metallic material (e.g., copper) or a hard plastic material, so that the airstream channel structure 30 may be of a fixed shape and may be formed as a holding member of the cap manipulator.

As shown in FIGS. 3 to 5, in the embodiments of the present disclosure, the airstream channel structure 30 may be of a column shape, and the first end surface 31 and the second end surface 32 are two opposite end surfaces of airstream channel structure 30. In the embodiments of the present disclosure, cross sections of the airstream channel structure 30 at positions along the airstream channel structure 30 may have a same structure and a same size, and each of the cross sections may be perpendicular to an extension direction of the airstream channel structure 30. To be specific, in the embodiments of the present disclosure, the airstream channel structure 30 may be of a cylindrical or be of a polyhedral shape.

In addition, in the embodiments of the present disclosure, the first airbag member 10 and the second airbag member 20 may be formed integrally with the airstream channel structure 30, so as to ensure the inner space of the first airbag member 10 to communicate with the inner space of the second airbag member 20 through the channel 33 of the airstream channel structure 30.

Figure 6:
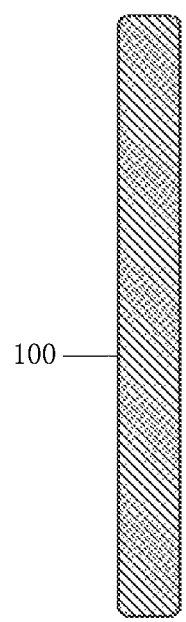
FIG. 6 is a structural schematic view of a first airbag member and a second airbag member integrally connected according to some embodiments of the present disclosure.

Optionally, in the embodiments of the present disclosure, a third airbag member may be arranged in the channel 33. The first airbag member 10, the second airbag member 20 and the third airbag member may be formed integrally, so as to form a column-shaped airbag 100 as shown in FIG. 6. Under a condition that the column-shaped airbag 100 is inserted into the channel 33 of the airstream channel structure 30 in FIG. 5 in such a manner that a first portion of the column-shaped airbag 100 is exposed beyond the first end surface 31 and a second portion of the column-shaped airbag 100 is exposed beyond the second end surface 32, the first portion exposed beyond the first end surface 31 may form the first airbag member 10, and the second portion exposed beyond the second end surface 32 may form the second airbag member 20. Through the third airbag member in the channel 33, the first airbag member 10 may communicate with the second airbag member 20, so as to form the cap manipulator as shown in FIG. 3.

An integral structure formed of the first airbag member, the second airbag member and the third airbag member may provide the cap manipulator with a simple structure and facilitate manufacturing the cap manipulator.

Figure 7:
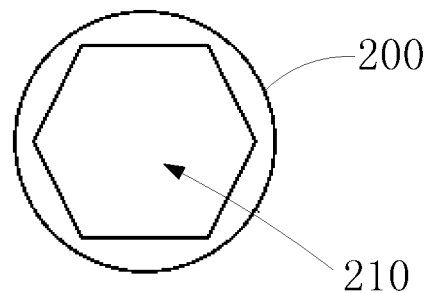
FIG. 7 is a structural top view of a cap to which the cap manipulator is applied according to some embodiments of the present disclosure.

The cap manipulator provided in some embodiments of the present disclosure may be applied to a cap which may be attached to the container in a pluggable manner. FIG. 7 is a top view of the cap to which the cap manipulator provided in the embodiments of the present disclosure is applied. An insertion space 210 is arranged in a top surface of the cap 200. In the embodiments of the present disclosure, the insertion space 210 is of a hexahedral shape or a hexagonal shape. Of course, the insertion space 210 may also be of any other polyhedral or column-shaped shape.

As shown in FIGS. 3 and 4, before the second airbag member 20 is squeezed, the volume of the first airbag member 10 may be smaller than or equal to the volume of the insertion space 210, so that the first airbag member 10 may be inserted into the insertion space 210. After the first airbag member 10 has been inserted into the insertion space 210 and under a condition that the second airbag member 20 is squeezed, the volume of the first airbag member 10 may increase, and thereby the first airbag member 10 may press against the inner surface of the insertion space 210. In this way, due to pressing against the inner surface of the insertion space 210 by the first airbag member 10, the first airbag member 10 may be be fixedly attached to the cap 200.

At this time, if the second airbag member 20 is squeezed by one hand and the airstream channel structure 30 is held and pulled upward by the other hand, the first airbag member 10 may bring the cap 200 to move upwards, so that the cap 200 may be detached from the container. If the airstream channel structure 30 is held and pulled downwards by the other hand, the first airbag member 10 may bring the cap 200 to move downwards so that the cap 200 may be attached to the container.

Hence, through arranging the airbag members in the cap manipulator in the embodiments of the present disclosure and providing the airbag members with variable volumes, hands of a person do not hold or touch any portion of the cap in a process of attaching the cap to or detaching the cap from the container, thereby preventing the substance in the container from being polluted. In addition, an operation using the cap manipulator is simple and convenient.

Optionally, in the cap manipulator in the embodiments of the present disclosure, the airstream channel structure may further include a mating member connected to the first airbag member and configured to drive the cap to rotate with rotation of the mating member. Through the mating member, under a condition that the cap is operated by using the cap manipulator and the first airbag member is inserted into the insertion space of the cap, the mating member may be cooperatively connected to the cap. If the airstream channel structure is rotated, the rotation of the airstream channel structure may drive the cap to rotate, so that the cap manipulator may be applied to a case in which the cap is connected to the container by a threaded connection and thus the cap has to be rotated for a purpose of attaching cap to the container or detaching the cap from the container.

To be specific, under a condition that the insertion space of the cap is of a polyhedral shape, the mating member of the airstream channel structure may also be of the polyhedral shape. If the first airbag member is inserted into the insertion space of the cap, at least a part of the mating member may also be inserted into the insertion space, and outer surfaces of the mating member may mate with inner surfaces of the insertion space in a one-to-one correspondence manner, so as to drive the cap to rotate with the rotation of the airstream channel structure.

Optionally, the insertion space of the cap may have a boundary of a regular hexahedral shape or a regular hexagonal shape, and the mating member may be a structure of a regular hexahedral shape or a regular hexagonal shape.

Figure 8:
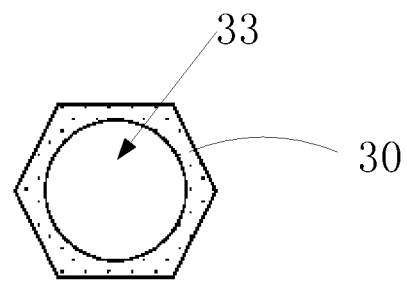
FIG. 8 is a structural sectional view of the airstream channel structure in the cap manipulator according to some embodiments of the present disclosure.

Hence, based on the above, as shown in FIG. 8, the cross section of the airstream channel structure 30 at each position of the airstream channel structure in the cap manipulator may be of a regular hexagonal shape, i.e., the airstream channel structure 30 may be a structure of a regular hexagonal shape. In such a case, an entirety of the airstream channel structure 30 may form the mating member mating with the insertion space of the cap and capable of driving the cap to rotate.

Figure 9:
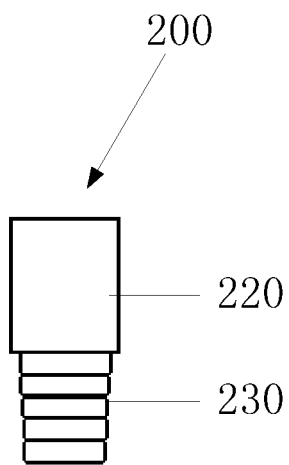
FIG. 9 is a structural front view of the cap to which the cap manipulator is applied according to some embodiments of the present disclosure.

FIG. 9 is a structural schematic view of a cap in a threaded connection with the container. As shown in FIG. 9, the cap 200 may include a first member 220 and a second member 230 connected to the firs member 220. Optionally, each of the first member 220 and the second member 230 may be of a cylindrical shape. The insertion space 210 (as shown in FIG. 7) may be formed in an end surface of the first member 220 away from the second member 230 (i.e., in a top surface of the first member 220), and an outer circumferential surface of the second member 230 may be threaded.

To be specific, as shown in FIG. 7, the insertion space 210 may be the space of the regular hexagonal shape. Under a condition that the airstream channel structure 30 is inserted into the insertion space 210, the outer surfaces of the airstream channel structure 30 may mate with the inner surfaces of the insertion space 210 in a one-to-one correspondence manner.

Figure 10:
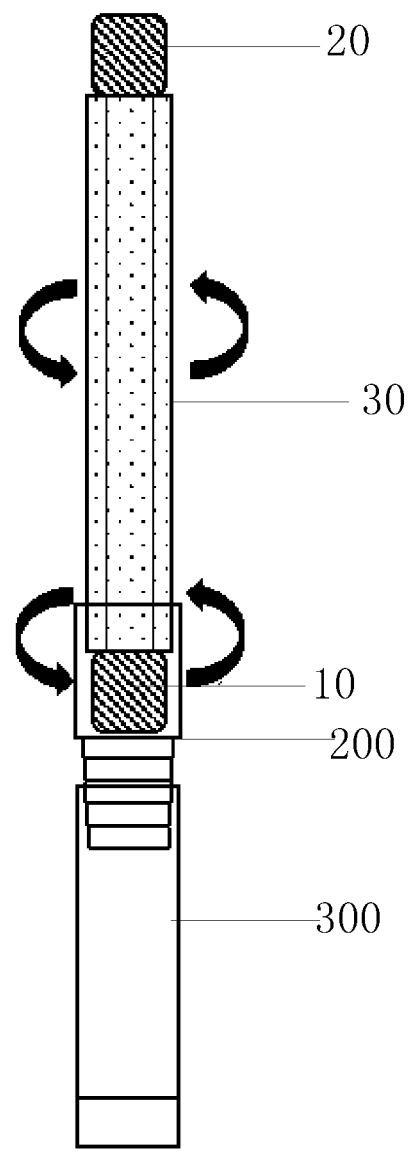
FIG. 10 is a schematic view of the cap manipulator in a first operational state according to some embodiments of the present disclosure.
Figure 11:
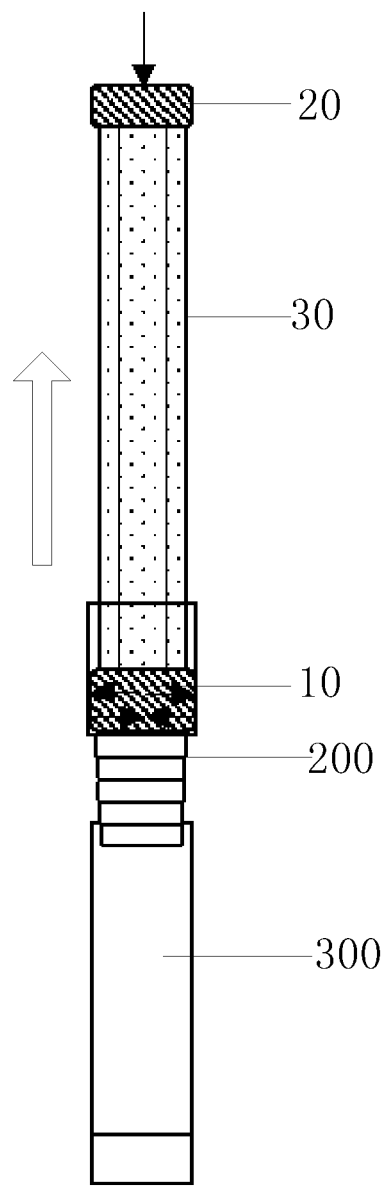
FIG. 11 is a schematic view of the cap manipulator in a second operational state according to some embodiments of the present disclosure.
Figure 12:
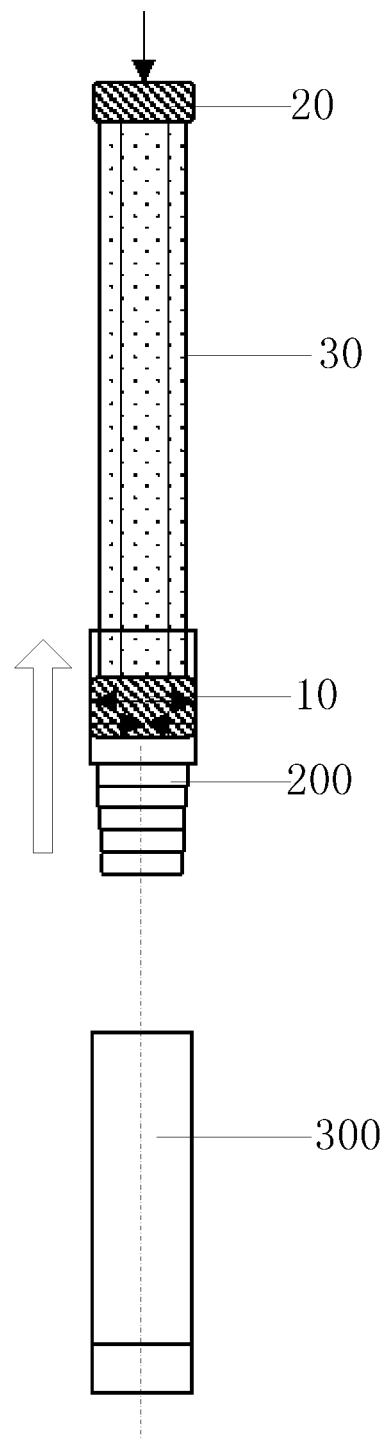
FIG. 12 is a schematic view of the cap manipulator in a third operational state according to some embodiments of the present disclosure.

With the above structure, as shown in FIGS. 10 to 12, under a condition that the cap 200 is covered onto the container 300, a specific procedure of detaching the cap 200 from the container 300 using the cap manipulator will be described as follows.

The second airbag member 20 is in a non-squeezed state, and the first airbag member 10 may be inserted into the insertion space 210 of the cap 200. Because a depth of the insertion space 210 is greater than a height of the first airbag member 10, a portion of the airstream channel structure 30 may also be inserted into the insertion space 210 in such a manner that outer surfaces of the airstream channel structure 30 may mate with the inner surfaces of the insertion space 210 in a one-to-one correspondence manner. The airstream channel structure 30 may be rotated, so as to drive the cap 200 to rotate relative to the container 300 in such a direction as to be detachable from the container 300. Under a condition that a threaded portion of the cap 200 is detached from a threaded portion of the container 300, the second airbag member 20 may be squeezed by one hand, and the airstream channel structure 30 may be held by the other hand, so as to increase the volume of the first airbag member 10 due to the second airbag portion being squeezed and thereby to enable the first airbag member 10 to be fixedly attached to the cap 200. In this way, when the airstream channel structure 30 is pulled upwards, the cap 200 may be detached from the container 300.

Similarly and based on a same operational principle, under a condition that the cap 200 is detached from the container 399, and the cap 200 is to be covered onto the container 300, the second airbag member 20 should be kept to be in a squeezed state so that the first airbag member 10 may be kept to mate with the cap 200. Thereafter, the airstream channel structure 30 may be held and the cap 200 may be inserted into the container 300. Then, the airstream channel member 30 may be rotated so as to drive the cap 200 to rotate relative to the container 300 in such a direction as to be fixedly attached to the container 300. After the threaded portion of the cap 200 mates with the threaded portion of the container 300 to a maximum extent, attachment of the cap 200 to the container 300 may be completed. Then, the second airbag member 20 is released, so as to enable the first airbag member 10 to restore to a unexpanded state (i.e. an original state) and the cap manipulator may be pulled out of the cap 200.

According to the above solutions, in a process of detaching the cap from the container and attaching the cap to the container using the cap manipulate, the cap is not touched or held by hands and the substance in the container may be prevented from being polluted.

Optionally, in the cap manipulator provided in the embodiments of the present disclosure, both the first airbag member 10 and the second airbag member 20 may cooperate with the insertion space of the cap and achieve the above-mentioned attachment of the cap to the container or detachment of the cap from the container. In other words, a function of the first airbag member 10 may be replaced with a function of the second airbag member 20, and, vice versa. To be specific, the second airbag member 20 may be arranged in the insertion space of the cap, and the first airbag member 10 may be squeezed, so as to increase a volume of the second airbag member 20 and thereby to enable the second airbag member 20 to be fixedly attached to the cap.

Some embodiments of the present disclosure further provide a cap assembly. Specifically, the cap assembly includes a cap with an insertion space and the above-mentioned cap manipulator. The structure of the cap manipulator may be obtained by referring to those described in FIGS. 1 to 12, and thus will not be particularly defined herein.

The cap manipulator with the above-mentioned structure may be in a first state in which the first airbag member is arranged in the insertion space and a second state in which the first airbag member is withdrawn from the insertion space. Under a condition that the first airbag member is arranged in the insertion space of the cap and the second airbag member is squeezed, the volume of the first airbag member may be enlarged due to the airstream channel structure between the first airbag member and the second airbag member, and the first airbag member may tightly mate with the cap. As a result, the cap may be attached to or detached from the container by using the cap manipulator.

Optionally, the cap may include a first member and a second member connected to the first member. The insertion space may be provided in an end surface of the first member away from the second member, and an outer circumferential surface of the second member may be threaded.

Under a condition that the cap manipulator is in the first state, at least a portion of the airstream channel structure may be arranged in the insertion space, so as to form a mating member configured to drive the first member to rotate with rotation of the airstream channel structure.

By providing the mating member, the cap may be attached to or detached from the container by using the cap manipulator in a threaded manner without holding the cap by hands, thereby preventing the substance in the container from being polluted. The structure of the mating member of the cap manipulator and the structure of the cap mated with the mating member may be obtained by referring to those in FIGS. 7 to 12, and thus will not be particularly defined herein.

The cap manipulator and the cap assembly provided in the embodiments of the present disclosure may be applied to cryogenic vials for cells. To be specific, the cap cooperating with the cryogenic vial may be provided, the top surface of the cap may be configured with a hexagonal insertion space. Through the cap manipulator having above structure, the cap may be attached to or detached from the cryogenic vial while the hand is not in contact with a mouth of the cryogenic vial, thereby to prevent the substance in the cryogenic vial from being polluted. In addition, since the freezing tube is usually of a relatively small volume, and when the above-mentioned cap manipulator is used to manipulate the cap, an accurate operation may be ensured and labor may be saved.

The above embodiments are optional embodiments. It should be noted that a person skilled in the art may make further modifications and improvements without departing from the spirit of the present disclosure, and these modifications and improvements shall also fall within the scope of the present disclosure.

What is claimed is:

1. A cap manipulator, the cap manipulator being used for a cap with an insertion space, the cap manipulator comprising:

a first airbag member and a second airbag member; and an airstream channel structure connected between the first airbag member and the second airbag member, and configured to enable an inner space of the first airbag member to communicate with an inner space of the second airbag member, wherein the first and second airbag members and the airstream channel structure are configured such that under a condition that the second airbag member is squeezed, a volume of the first airbag member is larger than a volume of the insertion space, and under a condition that the second airbag member is not squeezed, the volume of the first airbag member is smaller than or equal to the volume of the insertion space; and wherein a portion of an outer surface of the airstream channel structure is provided a mating portion, the mating portion is connected to the first airbag member and is configured to mate with an inner surface of the insertion space, the insertion space is a polyhedral space and the mating portion is of a polyhedral structure corresponding to the insertion space.

2. The cap manipulator according to claim 1, wherein the airstream channel structure comprises a first end surface, a second end surface, and a channel between the first end surface and the second end surface and running through the airstream channel structure, the first airbag member is arranged at the first end surface, the second airbag member is arranged at the second end surface, and the inner space of the first airbag member communicates with the inner space of the second airbag member through the channel.

3. The cap manipulator according to claim 2, wherein the airstream channel structure is of a column shape, and the first end surface and the second end surface are two opposite end surfaces of the airstream channel structure.

4. The cap manipulator according to claim 3, wherein cross sections of the airstream channel structure at positions along the airstream channel structure have same structures and same sizes, and each of the cross sections is perpendicular to an extension direction of the airstream channel structure.

5. The cap manipulator according to claim 2, further comprising:

a third airbag member in the channel, wherein the first airbag member, the second airbag member and the third airbag member are connected integrally.

6. The cap manipulator according to claim 1, wherein the polyhedral space is a regular hexagonal space, and the polyhedral structure is a regular hexagonal structure.

7. A cap assembly, comprising:

the cap with the insertion space, and the cap manipulator according to claim 1, wherein the cap manipulator is configured to be in a first state in which the first airbag member is inside the insertion space or in a second state in which the first airbag member is pulled out of the insertion space.

8. The cap assembly according to claim 7, wherein the cap comprises a first member and a second member connected to the first member, the insertion space is at an end surface of the first member away from the second member, and an outer circumferential surface of the second member is threaded, and under a condition that the cap manipulator is in the first state, at least a portion of the airstream channel structure is in the insertion space, so that the mating portion is configured to drive the first member to rotate when the airstream channel structure is rotated.

9. A cap manipulator, the cap manipulator being used for a cap with an insertion space, the cap manipulator comprising:

a first airbag member, a second airbag member and a third airbag member, and an airstream channel structure connected between the first airbag member and the second airbag member, and configured to enable an inner space of the first airbag member to communicate with an inner space of the second airbag member, wherein the first and second airbag members and the airstream channel structure are configured such that under a condition that the second airbag member is squeezed, a volume of the first airbag member is larger than a volume of the insertion space, and under a condition that the second airbag member is not squeezed, the volume of the first airbag member is smaller than or equal to the volume of the insertion space;

wherein the airstream channel structure comprises a first end surface, a second end surface, and a channel between the first end surface and the second end surface and running through the airstream channel structure;

wherein the first airbag member is arranged at the first end surface, the second airbag member is arranged at the second end surface, and the inner space of the first airbag member communicates with the inner space of the second airbag member through the channel; and wherein the third airbag member is in the channel, and the first airbag member, the second airbag member and the third airbag member are connected integrally.

10. A cap assembly, comprising:

a cap with an insertion space, and a cap manipulator, comprising a first airbag member and a second airbag member, and an airstream channel structure connected between the first airbag member and the second airbag member, and configured to enable an inner space of the first airbag member to communicate with an inner space of the second airbag member, wherein the first and second airbag members and the airstream channel structure are configured such that under a condition that the second airbag member is squeezed, a volume of the first airbag member is larger than a volume of the insertion space, and under a condition that the second airbag member is not squeezed, the volume of the first airbag member is smaller than or equal to the volume of the insertion space;

wherein a portion of an outer surface of the airstream channel structure is provided a mating portion, the mating portion is connected to the first airbag member and is configured to mate with an inner surface of the insertion space;

wherein the cap manipulator is configured to be in a first state in which the first airbag member is inside the insertion space or in a second state in which the first airbag member is pulled out of the insertion space;

wherein the cap comprises a first member and a second member connected to the first member, the insertion space is at an end surface of the first member away from the second member, and an outer circumferential surface of the second member is threaded; and wherein under a condition that the cap manipulator is in the first state, at least a portion of the airstream channel structure is in the insertion space, so that the mating portion is configured to drive the first member to rotate when the airstream channel structure is rotated.

* * * * *